Patented Aug. 29, 1944

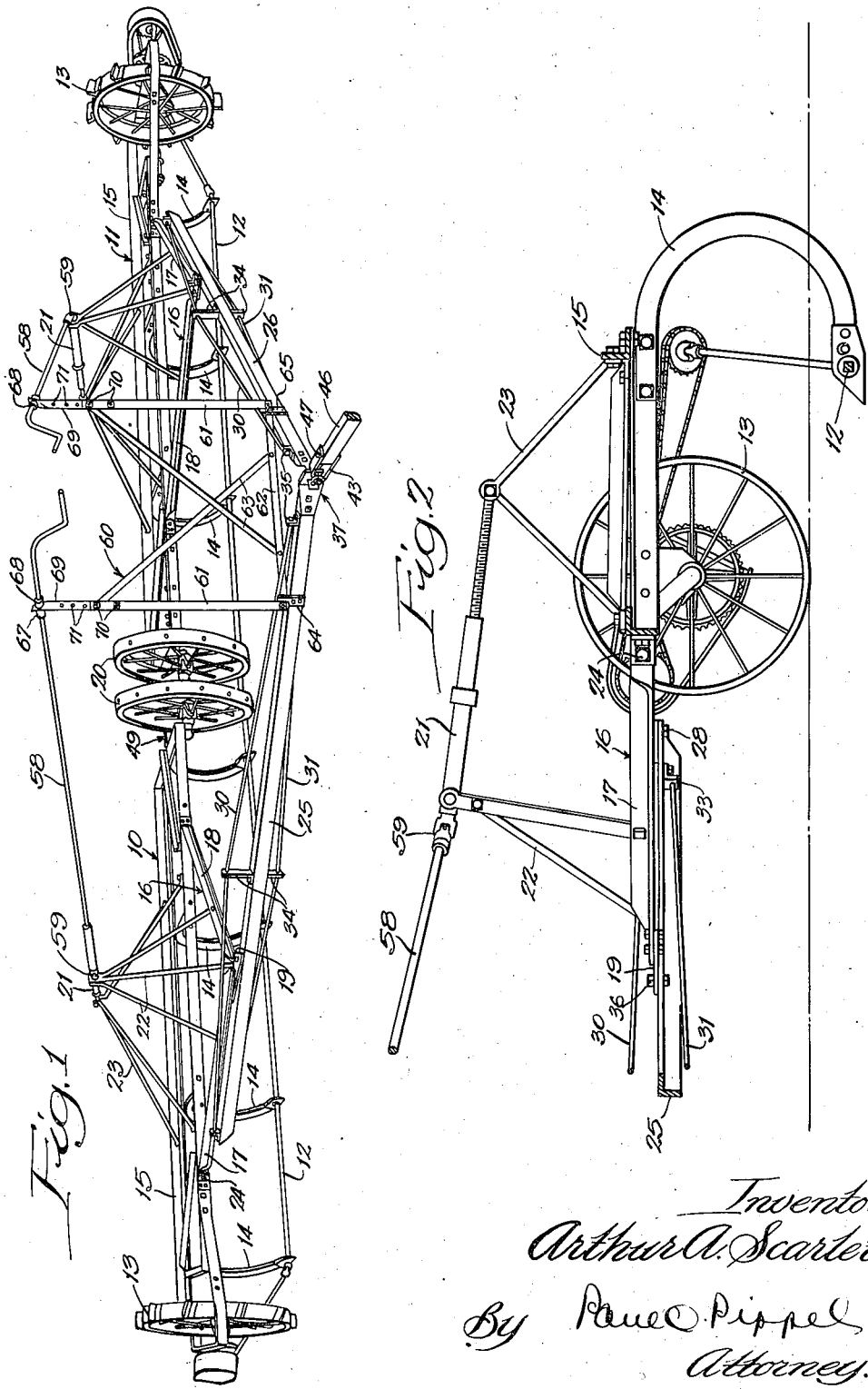

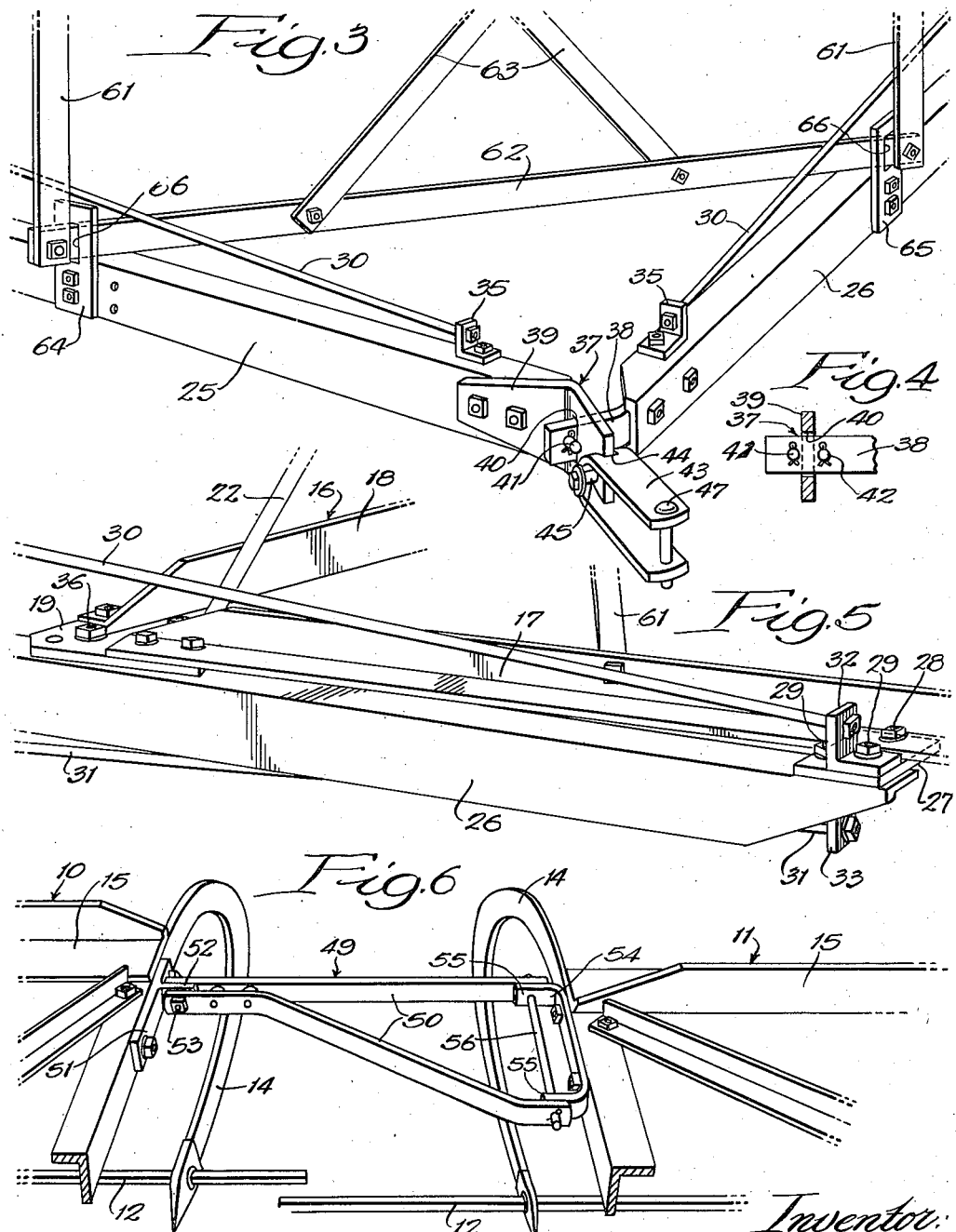

2,356,889

UNITED STATES PATENT OFFICE 2,356,889

AGRICULTURAL IMPLEMENT

Arthur A. Scarlett, Hamilton, Ontario, Canada, assignor, by mesne assignments, to International Harvester Company, Chicago, Ill., a corporation of New Jersey Application March 18, 1942, Serial No. 435,127

6 Claims. (Cl. 97—42)

This invention relates to trail-behind agricultural implements and more particularly to means for hitching together a pair of such implements in transverse alinement with respect to each other.

It is an object of the invention to provide a hitching arrangement for the connecting together of a pair of transversely alined agricultural implements for joint operation and for the connection of the same to the tractor draw element of a tractor, wherein free vertical flexibility of the respective implements with respect to each other will be maintained and at the same time while operating the combined implements as a single unit.

It is another object of the invention to provide a supporting structure for the extensions of the manually adjustable means provided on the respective implements, wherein the adjustment may be made at a location near to the hitch point of the implement with the tractor and wherein this supporting structure while carried by the hitching arrangement will not interfere with the flexibility of the implements and their hitch members with respect to each other.

According to the present invention, there are connected to the outer angularly arranged member, forming a part of the hitch frames of the respective implements, hitch members extending coextensively with the same and forwardly thereof to a common location where provision is made for the hingedly connecting of the same together for free vertical movement with respect to each other. The tool-supporting frames of the respective implements are also hingedly tied together, whereupon the respective implements are permitted to vertically flex with respect to each other. The means for connecting the forward ends of the hitch members together serves as the means for the connecting of the combined unit to the tractor draw-bar element. Connected to the manually adjustable means of the respective implements are crank extensions which extend forwardly to a location immediately above the forward ends of the hitch members. A supporting structure is provided for the forward ends of these crank extensions, and this supporting structure is so connected to the hitch members as not to interfere with the flexibility of the same with respect to each other. Use is made of these crank extensions for maintaining the supporting structure in its vertical position. The supporting structure is further provided with adjustable means whereby the forward ends of the crank extensions can be adjusted to a variety of different vertical heights above the hitch members.

For other objects and for a better understanding of the invention reference may be had to the following detailed description taken in connection with the accompanying drawings, in which:

Figure 1 is a perspective view of the transversely alined agricultural implements and of the hitching arrangement embodying the features of the present invention;

Figure 2 is an enlarged detail view in elevation taken in a vertical plane through one of the implements showing its main frame and the manually adjustable means for adjusting the same relative to its hitch frame;

Figure 3 is an enlarged perspective view of the forward ends of the hitch members and of the bottom of the supporting structure for the crank extensions;

Figure 4 is a detailed view illustrating the hinge connection of the forward ends of the hitch members;

Figure 5 is an enlarged view illustrating the connection of the individual hitch members with the outer angularly arranged members of the individual implement hitch frames; and Figure 6 is an enlarged perspective view of the means for hingedly connecting together the main frames on the respective implements.

Referring now particularly to Figure 1, there is shown a pair of laterally arranged agricultural implements 10 and 11, each of which being a single rod weeder having a rod 12 adapted to be driven by one of its ground-supporting wheels 13. The rod 12 is supported on downwardly extending shanks 14 carried by a main frame 15 to which is pivotally connected, as viewed more clearly in Figure 2, a draft frame 16 formed of a pair of angularly arranged forwardly extending members 17 and 18 coming to a common hitch point and there rigidly secured together by means of a plate 19. The main frame 15 is supported at its inner end by a supporting wheel 20.

As a means for varying the working depth of the rod 12, there is provided on each implement a manually adjustable threaded coupling means 21 supported from the draft frame by a tripod arrangement 22 and on the main frame 15 by a vertically extending rod structure 23. The threaded coupling means lying between these two structures and adapted to be adjustable will cause adjustment taking place with buckling of the main frame 15 about its pivotal connection 24 with its draft frame 16. As the union point 24 is moved downwardly, the frames are so buckled with respect to each other that the rod element 12 is given a more shallow operating depth in the ground. Further adjustments of the union point in the same direction will eventually effect movement of the rod 12 to a point clear of the ground or its transport position. The supporting wheels 13 and 20 are rigid with the frame structure 15 and any movement of the frame 15 is about the supporting wheels.

It is the purpose of the present invention to provide an arrangement for maintaining the transverse alinement of the respective implements 10 and 11 and at the same time to allow for a flexible movement of the same with respect to each other. To accomplish this purpose there is connected to the outer angularly disposed piece 17 of the draft frame 16 of the respective implements, the respective hitch members 25 and 26. These hitch members are rigidly connected to the draft frames of the respective implements as to be rigid with the same and to run coextensive with its frame pieces 17. Referring now particularly to Figure 5, it will be noted how the connection of the hitch member 26 is connected to the draft frame 16 of the agricultural implement 11. At its rearward end of the hitch member 26 is connected the piece 17 which is of angle construction by means of a plate 27 connected to the underside of the piece 17 by a bolt 28. This plate 27 extends outwardly and is connected to the hitch member by bolts 29. It is often desired that these hitch members 25 and 26 be reenforced by upper and lower truss rods 30 and 31 which are rigidly connected to the rearward end of the hitch member by angles 32 and 33 secured by one of the bolts 29 to the plate 27 and the rear end of the hitch member 26. Intermediate of the length of the hitch member, the truss rods are supported by king posts 34 and finally connected at their forward ends to the hitch member by bolt and angle means 35. To further make the hitch member 26 secure with the frame, the same is rigidly connected to the forward plate 19 of the respective draft frames 16 by a bolt means 36. It should now be apparent that each hitch member is rigidly connected respectively with the draft frames of the respective implements.

The two hitch members 25 and 26 extend angularly and forwardly to a common location where the same are hingedly connected together by a tongue and slot arrangement indicated generally at 37, and as shown more clearly in Figures 3 and 4 of the drawings. This tongue and slot means includes a tongue member 38 carried by the hitch member 26 and a plate member 39 carried by the hitch member 25 and having therein a slot 40 through which the tongue 38 of the hitch member 26 extends. The tongue 38 is secured in the slot 40 for limited lateral movement by means of pins 41 and 42 carried by the tongue 38 and as viewed more clearly in Figure 4. These pins 41 and 42 are sufficiently far apart so as to provide for the necessary hinging movement of the hitch members 25 and 26 with respect to each other and in no way interfere with the vertical flexing movement of the same. The plate piece 39 on the hitch member 25 extends sufficiently forward to permit the connection of a clevis 43 thereto. This clevis 43 has a vertically extending slot 44 which fits over the end of the plate member 39 and is secured thereto by a transversely extending pin means 45. It should thus be apparent that the hinge-connecting means 37 serves as a means for connecting the combined implements to a tractor draw-bar element 46 in the manner shown in Figure 1. This tractor draw-bar element 46 is that provided on the usual tractors and its connection can be readily made with the clevis 43 by means of a hitch pin 47.

Referring now particularly to Figure 6, it will be noted that the main frames of the respective implements 10 and 11 are connected together by a hinge connection means 49. This hinge connection means is for the purpose of allowing free vertical movement of the main frames of the respective implements with respect to each other. This hinge connection means 49 includes a pair of transversely extending straps 50 connected to the frame 15 of the implement 10 by means of a plate 51 having a laterally projected portion 52, the connections being made with the latter by means of a pivot bolt 53. The strap members 50 are connected with the frame 15 of the implement 11 by a U-shaped member 54 having laterally turned ends 55 through which extends a pin 56 to the outer ends of which the straps 50 are pivotally connected. It should thus now be apparent that the frames of the respective implements may have free vertical movement independently of each other, and at the same time the implements in their operation over a transverse plane are affected as a combined unit. By means of the hitch members 25 and 26, each implement is held rigid in its laterally alined position and turning movement in one direction or the other will be respectively about the other wheels of the respective implements.

With this hitch arrangement extending forwardly as it does, the manually adjustable means 21 of the respective implements becomes remote from the operator on the tractor, and hence it is a feature of the present invention to provide means whereby these manually adjustable means will be accessible to the operator of the tractor and to provide such a means which will not interfere with the vertical flexibility of the hitch members. Accordingly, each manually adjustable means 21 is provided with a crank extension 58 connected by a universal joint 59 with the manually adjustable means 21, and the same extends forwardly to a location where it is supported on the forward end of the hitch members 25 and 26 by means of a vertically extending supporting structure 60. This structure 60 includes vertically extending members 61 connected at their lower ends by a transversely extending member 62 and braced by diagonally disposed members 63. The transverse member 62 extends through plates 64 and 65 on the respective hitch members 25 and 26. Each of these plates has openings 66 therethrough to receive the transverse member 62. These openings are of sufficient size as to allow a considerable looseness in the connection of the transverse member 62 to the plates 64 and 65. This looseness at these openings is sufficient so as not to interfere with the vertical flexibility of the hitch members 25 and 26 in their union with the hinge connection means 37.

In order to maintain the vertically extending supporting structure 60 in its vertical position, the respective crank extensions 58 are provided with collars 67 and 68 located respectively at opposite sides of the vertically extending members 61 of the supporting structure 60. In order to provide for vertical adjustment of the forward ends of the crank extensions 58, the upper end of the vertical members 61 are provided with adjustable straps 69 retained by bolts 70 in a variety of vertical positions, the bolt 70 passing through any of a number of holes 71 in the straps 69.

It should now be apparent that there has been provided a hitch arrangement for laterally arranged agricultural implements, whereby these units can be operated as a combined unit and wherein at the same time the individual implements can have free vertical movement in order to adapt themselves more readily to ground contour. It should further be apparent that there has also been provided with such an arrangement means whereby the manually adjustable mechanism of the respective implements can be made accessible as well in the new arrangement to the operator on the tractor and that the means for supporting the manually adjustable extensions is so formed into the hitching arrangement that the same will not interfere with its vertical flexibility. Also the supporting means for the crank extensions always maintains the cranks in the same transverse position with respect to each other irrespective of the flexing of the hitch frames.

While various changes may be made in the detail construction of the invention, it shall be understood that such changes shall be within the spirit and scope of the present invention as defined by the appended claims.

What is claimed is:

1. In combination, a pair of agricultural implements arranged in lateral alinement with respect to each other, each of said implements including a main tool-carrying frame and a draft frame connected to the main frame, flexible means for combining the agricultural implements into a double arrangement made to operate as a single unit when connected to a tractor draw element but providing for free vertical flexing of the implements upwardly or downwardly with respect to each other, said combining means including hitch members respectively rigidly connected to the draft frames of the implements, means for hingedly connecting the draft members together at a location removed from their connection with the draft frames to permit relative vertical movement of said draft members bodily, and means for tying together the inner ends of the main frames of the implements to permit relative vertical movement of said inner ends, whereby free vertical flexing of the implements and their hitch members may be effected.

2. In combination, a pair of agricultural implements arranged in lateral alinement with one another, each of said implements including a main tool-carrying frame and a draft frame having angularly arranged members coming together at a common rigid hitch point, and means for combining the implements together for joint operation and for connection to a tractor draw element wherein vertical flexibility of the implements may result, said latter combining means including hitch members respectively connected coextensively and rigidly with the outer of the angularly arranged members of the individual draft frames and extending forwardly of the individual draft frames to a common location, hinge means for connecting together the forward ends of said latter hitch members to allow free relative vertical movement of the forward ends of said hitch members bodily with respect to each other and for serving as the hitch point for the connection of the combined implements to the tractor draw element, and means for tying together the inner ends of the main frames of the implements to permit relative vertical movement of said inner ends, whereby free vertical movement of either implement upwardly or downwardly with respect to the other may be effected.

3. In combination, a pair of agricultural implements arranged in lateral alinement with one another, each of said implements including parts adapted to be adjusted, manually adjustable means for adjusting said parts, and a draft frame and means for combining the implements together for joint operation and for connection to a tractor draw element but wherein vertical flexibility of the implements may result, said latter combining means including hitch members respectively rigidly connected to the individual draft frames and extending forwardly to a common location, hinge means for connecting together the forward ends of said latter hitch members to allow free vertical movement of the implements and their hitch members with respect to each other, an extension for the manually adjustable means of both of the implements, vertically extending means for supporting the extensions on the hitch members, and means for connecting the vertically extending means with the hitch members so as to allow freedom of movement of the hitch members with respect to each other, whereby the extensions will remain substantially fixed with respect to each other and unaffected by flexing movement of the hitch members.

4. In combination, a pair of rod weeders arranged in lateral alinement with respect to each other, each of said rod weeders including a main frame with a rotatable weeder rod thereon, a draft frame pivotally connected to the main frame, manually adjustable means connected between the main frame and the draft frame to buckle the same whereby the working depth of the weeder rod may be varied, and flexible means for combining the rod weeders together into a double arrangement for connection to a tractor draw element, said combining means including hitch members respectively rigidly connected to the draft frames of the rod weeders and extending forwardly to a common location, means for hingedly connecting the forward ends of the hitch members together to thereby allow vertical flexing of the same means for tying the main frames together for free vertical movement with respect to each other, forward extensions for the manually adjustable means, and means for supporting the extensions on the hitch members without interfering with the flexing of the hitch members and of the rod weeders.

5. In combination, a pair of rod weeders arranged in lateral alinement with respect to each other, each of said rod weeders including a main frame with a rotatable weeder rod thereon, a draft frame pivotally connected to the main frame, manually adjustable means connected between the main frame and the draft frame to buckle the same whereby the working depth of the weeder rod may be varied, and flexible means for combining the rod weeders together into a double arrangement for connection to a tractor draw element, said combining means including hitch members respectively rigidly connected to the draft frames of the rod weeders and extending forwardly to a common location, means for hingedly connecting the forward ends of the hitch members together to thereby allow vertical flexing of the same, means for tying the main frames together for free vertical movement with respect to each other, forward extensions for the manually adjustable means, means for supporting the extensions on the forward ends of the hitch members without interfering with the flexing of the hitch members and of the rod weeders, and said supporting means including vertically adjustable means for varying the vertical location of the forward extensions.

6. In combination, a pair of agricultural implements arranged in lateral alinement with respect to each other, each of said implements including a main tool-carrying frame with a working tool thereon and a draft frame connected to the main frame, and manually adjustable means for adjusting the working tool, flexible means for combining the agricultural implements into a double arrangement made to operate as a single unit when connected to a tractor draw-bar element but providing for free vertical flexing of the units with respect to each other, said combining means including hitch members rigidly connected to the respective draft frames of the implements, means for hingedly connecting the hitch members together for vertical flexing movement, extensions for the manually adjustable means, a vertically extending structure for supporting the extensions on the hitch members, said latter structure including a transverse member adapted to span the space between the hitch members, means provided on the hitch members having vertically extending slots for receiving the transverse member, said slots being of such size as to provide such looseness about the transverse member that the vertically extending structure does not interfere with the flexing of the hitch members, and means provided on the extensions whereby the extensions will themselves serve to brace the vertically extending structure.

ARTHUR A. SCARLETT.

CERTIFICATE OF CORRECTION.

Patent No. 2,356,889. August 29, 1944.

ARTHUR A. SCARLETT.

It is hereby certified that error appears in the printed specification of the above numbered patent requiring correction as follows: Page 3, first column, lines 44 and 47 respectively, for the word "draft" read --hitch--; and that the said Letters Patent should be read with this correction therein that the same may conform to the record of the case in the Patent Office.

Signed and sealed this 31st day of October, A. D. 1944.

(Seal)

Leslie Frazer
Acting Commissioner of Patents.